United States Patent [19]
Hasegawa et al.

[11] Patent Number: 5,690,381
[45] Date of Patent: Nov. 25, 1997

[54] SPARE SEAT FOR VEHICLE

[75] Inventors: Hiroaki Hasegawa, Tochigi-ken; Naohiro Takahashi, Saitama, both of Japan

[73] Assignees: Tokyo Seat Co., Ltd., Saitama-Ken; Honda Giken Kogyo Kabushiki Kaisha, Tokyo, both of Japan

[21] Appl. No.: 575,352

[22] Filed: Dec. 20, 1995

[30] Foreign Application Priority Data

Dec. 30, 1994 [JP] Japan .................. 6-339273

[51] Int. Cl.$^6$ .................................... A47C 15/00
[52] U.S. Cl. ........................ 297/234; 297/411.34
[58] Field of Search ........................ 297/233, 234, 297/236, 411.34, 144, 145

[56] References Cited

U.S. PATENT DOCUMENTS

| | | | |
|---|---|---|---|
| 18,377 | 10/1857 | Beach | 297/234 |
| 119,344 | 9/1871 | Glynn et al. | 297/236 |
| 1,282,220 | 10/1918 | Grondal | 297/236 X |
| 2,116,366 | 5/1938 | Scott | 297/234 X |
| 3,926,473 | 12/1975 | Hogan | 297/411.34 X |
| 4,768,827 | 9/1988 | Musgrove | 297/236 |

FOREIGN PATENT DOCUMENTS

| | | | |
|---|---|---|---|
| 691788 | 7/1930 | France | 297/234 |
| 761821 | 1/1934 | France | 297/234 |
| 836777 | 10/1938 | France | 297/234 |
| 262947 | 7/1913 | Germany | 297/234 |
| 1130123 | 5/1962 | Germany | 297/233 |
| 33533 | 2/1983 | Japan | 297/233 |
| 6340697 | 8/1988 | Japan . | |

*Primary Examiner*—Peter M. Cuomo
*Assistant Examiner*—David E. Allred
*Attorney, Agent, or Firm*—Dann, Dorfman, Herrell and Skillman, P.C.

[57] ABSTRACT

A folding spare seat for a vehicle, adapted to be arranged in a space about a side of a seat cushion of a main seat and adapted to be accommodated vertically in the space about the side of the seat cushion of the main seat after use of the spare seat, the spare seat comprising a seat cushion, a seat back foldably supported to the seat cushion of the spare seat, a support mechanism for pivotally supporting the seat cushion of the spare seat, the seat cushion of the spare seat pivotally supported to the support mechanism at points thereof which are spaced laterally from the side of the seat cushion of the main seat at an interval which is longer than a total width of the seat cushion and seat back of the spare seat in a folded state, and a locking mechanism for releasably locking the seat cushion of the spare seat to keep the seat cushion of the spare seat horizontal or vertical.

44 Claims, 4 Drawing Sheets

SPARE SEAT FOR VEHICLE

BACKGROUND OF THE INVENTION

1. Field of the Invention

This invention relates to an improvement of a spare seat for a vehicle, and more particularly to a spare seat which is adapted to be employed in a car generally referred to as "a walk-through type car", e.g., a wagon car and camping car. From the standpoint of efficient use of a space about the side of a seat cushion of a main seat of such a car, e.g., an individual seat or bench seat, the spare seat is adapted to be arranged in a space about the side of the seat cushion of the main seat.

2. Description of the Prior Art

This type of spare seat is conventionally employed in a sightseeing bus or the like. Such a spare seat comprises a seat cushion and a seat back foldably supported to the seat cushion of the spare seat. The seat cushion of the spare seat is pivotally supported at one side thereof to a seat cushion of a main seat through a bracket which is projected horizontally from the side of the seat cushion of the main seat, whereby the seat cushion of the spare seat is cantilevered. In use of the spare seat, the seat cushion of the spare seat is adapted to be rendered horizontal relative to the side of the seat cushion of the main seat and adapted to be projected toward a central aisle in the sight-seeing bus, and the seat back of the spare seat is adapted to be rendered vertical with respect to the seat cushion of the spare seat. After use of the spare seat, the seat cushion and seat back of the spare seat are adapted to be accommodated vertically in a space about the side of the seat cushion of the main seat, that is, the seat back of the spare seat is adapted to be folded horizontally and overlapped on the seat cushion of the spare seat, and the seat cushion of the spare seat, together with the seat back of the spare seat which has been overlapped on the seat cushion of the spare seat, is then pivoted and accommodated vertically in the space about the side of the seat cushion of the main seat.

In the conventional spare seat, since the seat cushion of the spare seat is merely cantilevered and supported at the side thereof by the bracket means as described above, the conventional spare seat will be unable to ensure a person a stable sitting. Also, the seat cushion of the spare seat is cantilevered, so that when the seat cushion and seat back of the spare seat are accommodated vertically in the space about the side of the seat cushion of the main seat, the seat cushion and seat back of the spare seat stand up considerably higher than a surface of the seat cushion of the main seat. In this case, the seat cushion and seat back of the spare seat which have stood up considerably high will prevent a person from walking in order to sit on and leave the main seat.

SUMMARY OF THE INVENTION

It is an object of this invention to provide a spare seat for a vehicle, which will be able to allow a person to stably sit on the spare seat.

It is another object of this invention to provide a spare seat for a vehicle, in which when a seat cushion and seat back of the spare seat are accommodated vertically in a space about the side of a seat cushion of a main seat, the standing position of the seat cushion and seat back of the spare seat will be relatively lowered, so that the spare seat will allow a person to easily walk in order to sit on and leave the main seat.

It is still another object of this invention to provide a spare seat for a vehicle, which will be able to be simply assembled.

In accordance with the present invention, a spare seat for a vehicle is provided. The spare seat is arranged in a space about a side of a seat cushion of a main seat. The spare seat comprises a seat cushion rendered horizontal relative to the seat cushion of the main seat in a position of use of the spare seat, a seat back foldably supported to the seat cushion of the spare seat, the seat back rendered vertical with respect to the seat cushion of the spare seat in the position of use of the spare seat and folded horizontally and overlapped on the seat cushion of the spare seat after use of the spare seat, support means for pivotally supporting the seat cushion of the spare seat, the seat cushion of the spare seat rendered vertical together with the seat back overlapped on the seat cushion of the spare seat after use of the spare seat, whereby the seat cushion and seat back of the spare seat are vertically accommodated in the space about the side of the seat cushion of the main seat after use of the spare seat, the seat cushion of the spare seat pivotally supported to the support means at points thereof which are spaced laterally from the side of the seat cushion of the main seat at an interval which is longer than a total width of the seat cushion and seat back of the spare seat in a vertical overlapped state, and locking means for releasably locking the seat cushion of the spare seat to keep the seat cushion of the spare seat horizontal or vertical.

The seat cushion of the spare seat may be pivotally supported to the support means at points thereof which are spaced laterally from the side of the seat cushion of the main seat at an interval which substantially corresponds in measure to the total width of the seat cushion and seat back of the spare seat in the overlapped state.

The locking means may comprise movable means pivotally connected to a section of the seat cushion of the spare seat which is adjacent the side of the seat cushion of the main seat, guide means for guiding a free section of the movable means in the directions nearer to and away from the main seat in response to pivotal movement of the seat cushion of the spare seat, the free section of the movable means movably engaged with the guide means, and means for catching the free section of the movable means to lock the seat cushion of the spare seat.

The movable means may comprise a substantially U-shaped body in outline. The movable means is pivotally connected at both end portions of the U-shaped body thereof to the section of the seat cushion of the spare seat which is adjacent the side of the seat cushion of the main seat. The guide means includes guide slit means. A horizontal portion of the movable means constitutes the free section of the movable means and is movably received in the guide slit means of the guide means.

The guide slit means may be opened at one end thereof. The spare seat may be assembled by preparing a first assembly and a second assembly separately and integrating the first assembly with the second assembly. The first assembly includes the seat cushion of the spare seat, the seat back foldably supported to the seat cushion of the spare seat, and the movable means pivotally connected at the both end portions of the U-shaped body thereof to the section of the seat cushion of the spare seat which is adjacent the side of the seat cushion of the main seat. The second assembly includes the support means, and the locking means including the guide means. The first and second assemblies are integrated by causing the horizontal portion of the U-shaped body of the movable means to be movably received in the guide slit means of the guide means through the opened end of the guide slit means and causing the seat cushion of the spare seat to be pivotally supported to the support means.

The spare seat may include releasing means for causing the seat cushion of the spare seat to be released from the locking means. The releasing means includes an operating lever.

Components of the spare seat other than the seat cushion and seat back of the spare seat may be covered by an armour casing. The armour casing has an internal space to allow the pivotal movement of the seat cushion of the spare seat together with the seat back, and a slit at a portion of the armour casing which positionally corresponds to a tip end portion of the operating lever when the components are covered by the armour casing for assembly. The tip end portion of the operating lever is projected out of the armour casing through the slit of the armour casing.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals designate the same parts throughout the Figures and wherein.

DETAILED DESCRIPTION OF THE PREFERRED EMBODIMENTS

A spare seat for a vehicle according to the present invention will be described hereinafter with reference to the accompanying drawings. The spare seat of the present invention generally includes a seat cushion, a seat back foldably supported to the seat cushion, support means for pivotally supporting the seat cushion, and locking means for releasably locking the seat cushion to keep the seat cushion horizontal or vertical.

Figure 1:
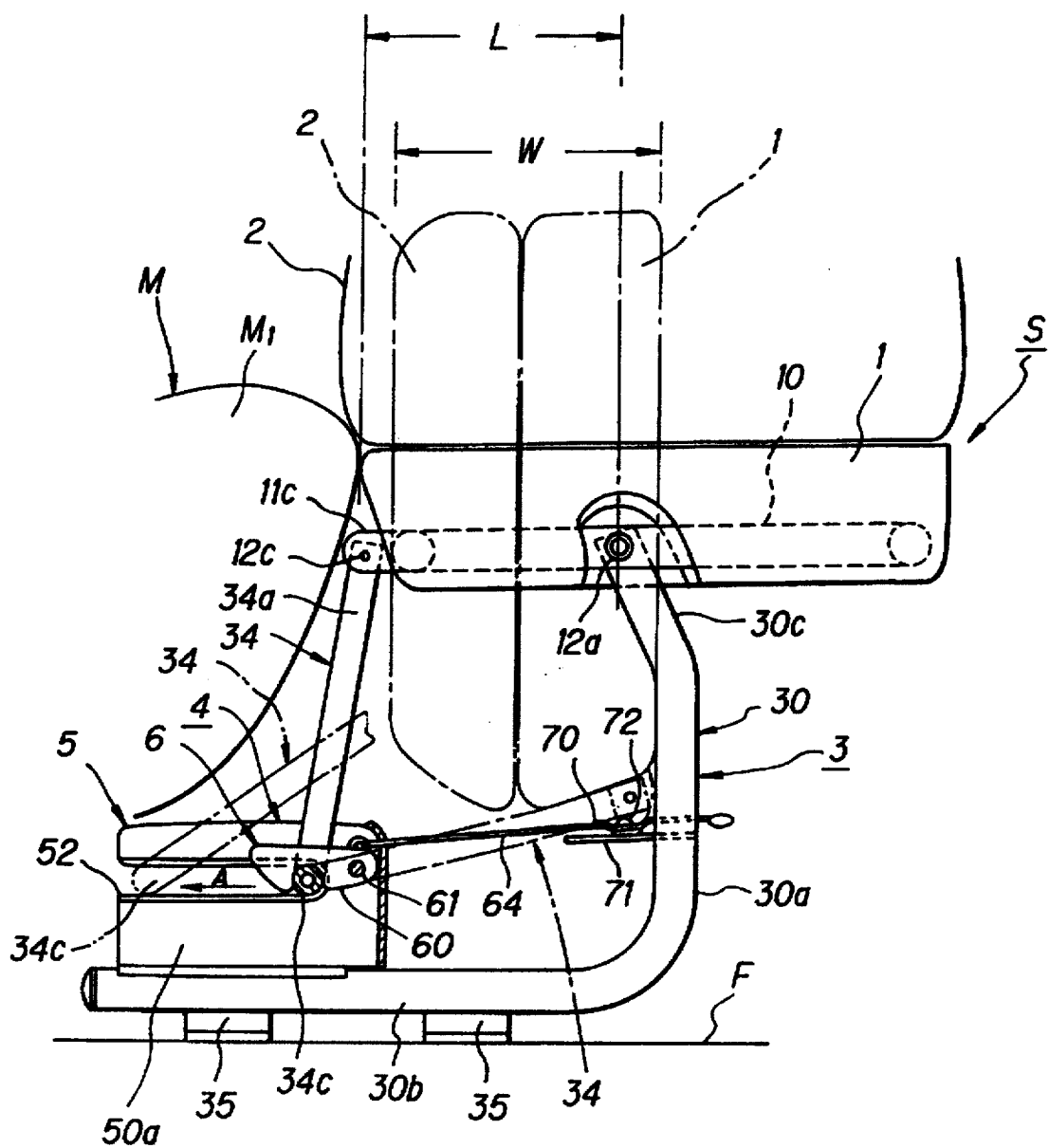
FIG. 1 is a schematic front view of a seat cushion of a main seat at the side of which a spare seat for a vehicle according to the present invention is arranged.

Referring now to FIG. 1, there are schematically illustrated a main seat M, e.g., an individual or bench seat, and a spare seat S of the present invention arranged in a space about the side of a seat cushion $M_1$ of the main seat M. The spare seat S includes a seat cushion 1 and a seat back 2. The seat cushion 1 of the spare seat S includes a cushioned padding, a base frame 10, an under cover and a covering sheet as will be discussed in greater detail hereinafter, and is pivotally supported to support means 3. The seat back 2 of the spare seat S is foldably supported to the seat cushion 1 of the spare seat S by any suitable means. The seat cushion 1 of the spare seat S in use is adapted to be rendered horizontal relative to the seat cushion $M_1$ of the main seat M.

The seat back 2 of the spare seat S in use is adapted to be rendered vertical with respect to the seat cushion 1 of the spare seat S. After use of the spare seat S, the seat cushion 1 and seat back 2 of the spare seat S are adapted to be accommodated vertically in the space about the side of the seat cushion $M_1$ of the main seat M. More particularly, after use of the spare seat S, the seat back 2 of the spare seat S is folded horizontally with respect to the seat cushion 1 of the spare seat S and overlapped on the seat cushion 1, and the seat cushion 1 of the spare seat S, together with the seat back 2 of the spare seat S which has been overlapped on the seat cushion 1 of the spare seat S, is then pivoted, whereby the seat cushion 1 and seat back 2 of the spare seat S are accommodated vertically in the space about the side of the seat cushion $M_1$ of the main seat M.

Incidentally, in FIG. 1, the seat cushion 1 and seat back 2 of the spare seat S in a used state are shown by solid lines, and the seat cushion 1 and seat back 2 of the spare seat S in a vertically accommodated state are shown by alternate long and short dash lines.

Figure 2:
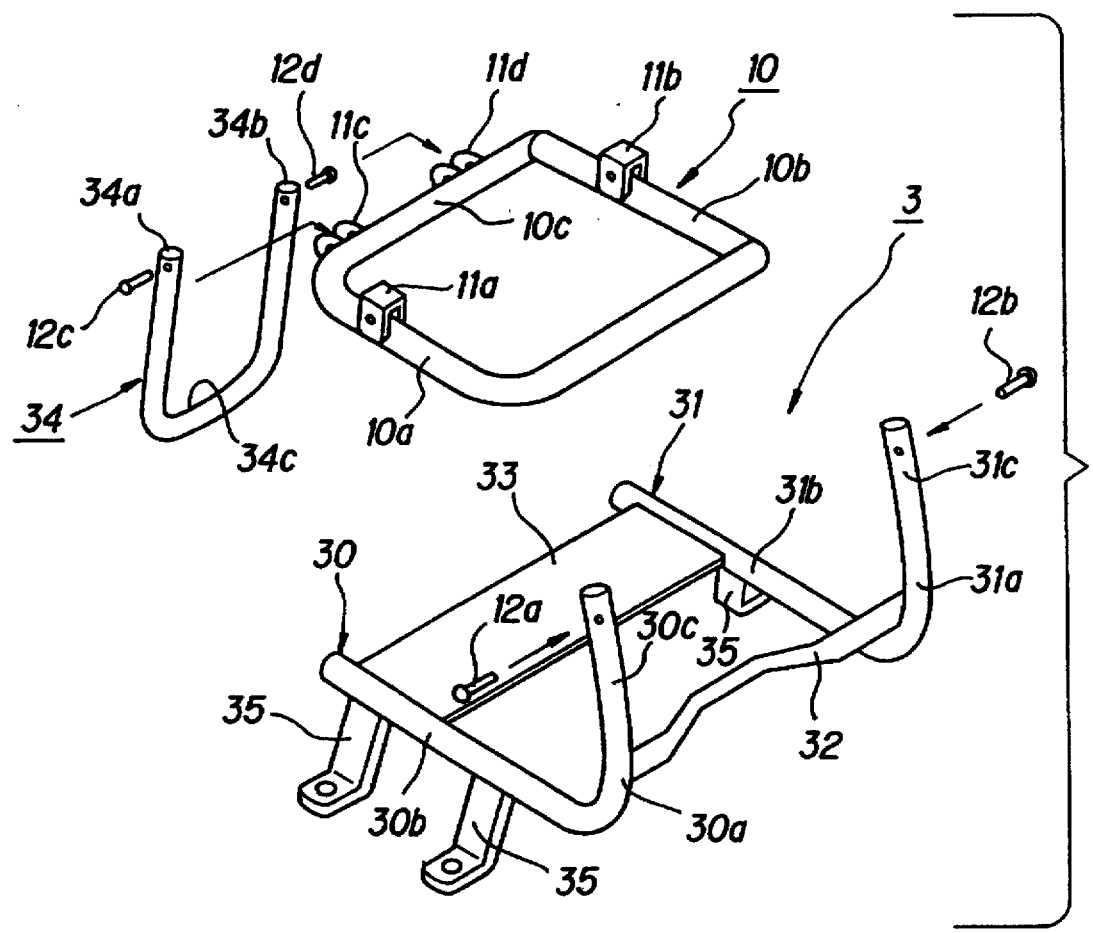
FIG. 2 is a schematic exploded perspective view of support means for pivotally supporting a seat cushion of the spare seat, a movable member of locking means, and a base frame of the seat cushion of the spare seat.

Referring to FIG. 2, there are schematically illustrated the base frame 10 of the seat cushion 1 and the support means 3. The base frame 10 of the seat cushion 1 is formed into a substantially square-ring shape in outline. The base frame 10 has a first pair of brackets 11a, 11b provided at two opposed sections 10a, 10b thereof, and a second pair of spaced apart brackets 11c, 11d provided at a section 10c of the base frame 10 which is adjacent the seat cushion $M_1$ of the main seat M.

The support means 3 comprises a pair of support members 30, 31 which are spaced apart from each other, a space keeping plate 32 for maintaining a space between the support members 30, 31 constant, a connecting plate 33, and legs 35 for allowing the whole spare seat S to be stably seated on a floor F (see FIG. 1) of a car. Each of the support members 30, 31 is formed into a substantially L-shape in outline by bending a bar or pipe material. The support member 30 comprises a vertical section 30a and a horizontal section 30b. Like the support member 30, the support member 31 comprises a vertical section 31a and a horizontal section 31b. The space keeping plate 32 is provided between the vertical section 30a of the support member 30 and the vertical section 31a of the support member 31. Also, the connecting plate 33 is provided between the horizontal section 30b of the support member 30 and the horizontal section 31b of the support member 31. The legs 35 are attached onto the undersurfaces of the horizontal sections 30b, 31b of the support members 30, 31.

As briefly described above, the seat cushion 1 of the spare seat S is pivotally supported to the support means 3. More particularly, the seat cushion 1 of the spare seat S is pivotally supported at the opposed sections 10a, 10b of the base frame 10 thereof to upper end portions 30c, 31c of the support members 30, 31 by applying the first brackets 11a, 11b of the base frame 10 to the upper end portions 30c, 31c of the support members 30, 31 and inserting support pins 12a, 12b through the upper end portions 30c, 31c of the support members 30, 31 and the brackets 11a, 11b of the base frame 10.

The support means 3 is arranged on the floor F of the car in a manner that the vertical sections 30a, 31a of the support members 30, 31 stand upright at positions which are spaced laterally from the side of the seat cushion $M_1$ of the main seat M at a given interval. The seat cushion 1 may be pivotally supported to the support members 30, 31 at points thereof which are spaced laterally from the side of the seat cushion $M_1$ of the main seat M at an interval which substantially corresponds in measure to or is longer than a total width W (see FIG. 1) of the seat cushion 1 and seat back 2 in a folded state. The illustrated embodiment is a good example in that the support members 30, 31 allow the standing position of the seat cushion 1 and back seat 2 in a vertically accommodated state to be lowered. More particularly, in the illustrated embodiment, the upper end portions 30c, 31c of the support members 30, 31 are slightly bent in a manner that tip ends of the upper end portions 30c, 31c of the support members 30, 31 face toward the main seat M, and the seat cushion 1 is pivotally supported to the bent upper end portions 30c, 31c of the support members 30, 31 at points thereof which are spaced laterally from the side of the seat cushion M₁ of the main seat M at an interval L (see FIG. 1) which substantially corresponds in measure to the total width W of the seat cushion 1 and seat back 2 in the folded state.

Figure 3:
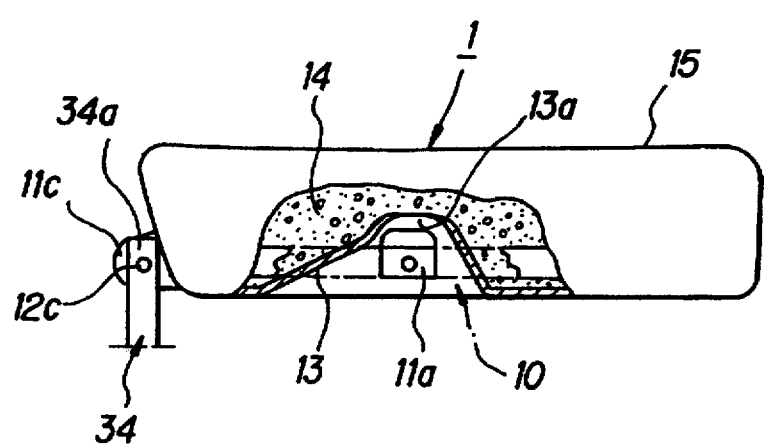
FIG. 3 is a schematic front view of the seat cushion of the spare seat with a portion of a covering sheet thereof cut away.

Referring to FIG. 3, the seat cushion 1 of the spare seat S includes the under cover 13 briefly described above. The under cover 13 has a recess portion 13a of a substantially inverted U-shape in vertical section formed at a region of the under cover 13 which positionally corresponds to the upper end portions 30c, 31c of the support members 30, 31 to which the base frame 10 of the seat cushion 1 is pivotally supported. When the seat cushion 1 is pivotally supported to the upper end portions 30c, 31c of the support members 30, 31 for assembly, the recess portion 13a of the under cover 13 is adapted to receive the upper end portions 30c, 31c of the support members 30, 31. The cushioned padding 14, base frame 10 and under cover 13 of the seat cushion 1 are covered by the covering sheet 15. A terminal portion of the covering sheet 15 is attached to an edge portion of the under cover 13 by any suitable means.

Again referring to FIG. 1, locking means 4 for releasably locking the seat cushion 1 to keep the seat cushion 1 vertical or horizontal is mounted on the connecting plate 33 (not shown) of the support means 3. The locking means 4 comprises movable means 34, guide means 5 for guiding the movable means 34, and means 8 for catching the movable means 34 to lock the seat cushion 1.

Again referring to FIGS. 2 and 3, the movable means 34 comprises a body formed into a substantially U-shape in outline. The U-shaped movable means 34 is pivotally connected at upper end portions 34a, 34b thereof to the section 10c of the base frame 10 of the seat cushion 1, which is adjacent the main seat M, by applying the upper end portions 34a, 34b of the movable means 34 to the second brackets 11c, 11d of the base frame 10 of the seat cushion 1 and inserting support pins 12c, 12d through the upper end portions 34a, 34b of the movable means 34 and the second brackets 11c, 11d. A free horizontal section 34c of the U-shaped body of the movable means 34 is movably received in guide slit means of the guide means 5 as will be discussed in greater detail, hereinafter. The guide means 5 acts as means to guide the free section 34c of the movable means 34 in a direction nearer to the the main seat M, i.e., a direction A as indicated by the arrow in FIG. 1 and a direction opposite to the direction A, in response to pivotal movement of the seat cushion 1.

Figure 4:
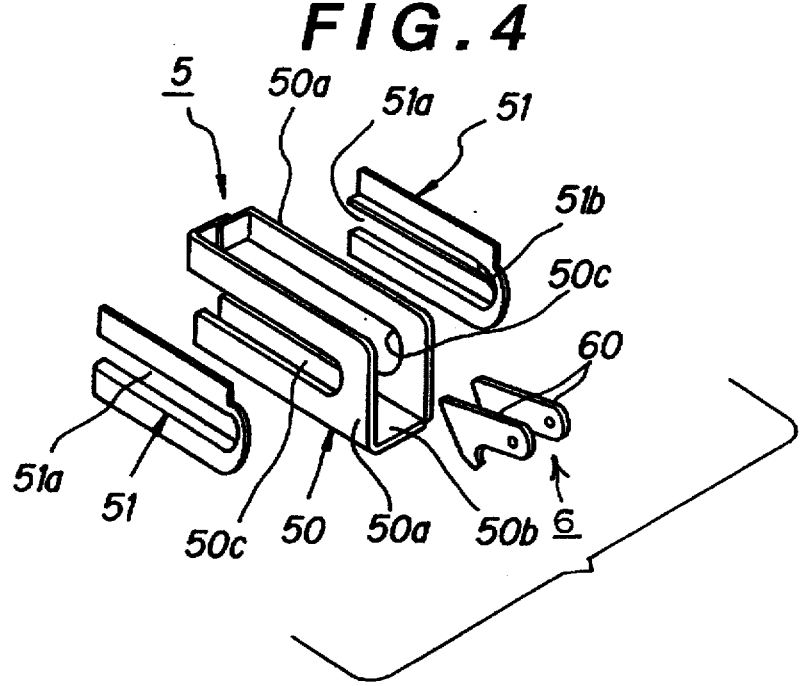
FIG. 4 is schematic exploded perspective view of the guide means.

Referring now to FIG. 4, the guide means 5 includes a guide frame 50 and a pair of side plates 51. The guide means 5 further includes guide slit means 52 (see FIG. 1) in which the free section 34c of the movable member 34 is movably received as shown in FIG. 1. The frame 50 of the guide means 5 is made of metal, while each of the side plates 51 of the guide means 5 is made of resinous material having a smoothness. The frame 50 comprises opposed side wall sections 50a and an intermediate section 50b interconnecting the opposed side wall sections 50a. Each of the opposed side wall sections 50a of the frame 50 has a horizontally extending slit 50c which is opened at one end of the slit 50c. Also, each of the side plates 51 has a horizontally extending slit 51a which is opened at one end of the slit 51a. Further, each of the side plates 51 has a rib 51b extending along an edge of the slit 51a. The frame 50 is arranged on the connecting plate 33 of the support means 3 with the opened ends of the slits 50c of the side wall sections 50a thereof facing toward the seat cushion M₁ of the main seat M. The side plates 51 are attached to the side wall sections 50a of the frame 50. More particularly, each of the side plates 51 is attached to corresponding one of the side wall sections 50a with the opened end of the slit thereof facing to the seat cushion M₁ of the main seat M and with the rib 51b thereof being fitted in the slit 50c of the corresponding side wall section 50a of the frame 50, whereby the guide slit means 52 is constituted in the guide means 5. Incidentally, in the illustrated embodiment of this invention, the side plates 51 in a pair are employed. In place of the side plates 51 in a pair, a unitary component, which has a resemblance to the guide frame 50 in shape and is constructed in the substantially same manner as the side plates 51 are done, may be employed. In this case, the unitary component is fitted on the guide frame As shown in FIG. 4, the means 6 for catching the movable means 34 comprises a pair of hook pieces 60. As will be discussed in greater detail hereinafter, the free section 34c of the movable means 34 which is movably received in the guide slit means 52 is adapted to be caught by the hook pieces 60. When the free section 34c of the movable means 34 is caught by the hook pieces 60, the seat cushion 1 is locked, whereby the pivotal movement of the seat cushion 1 is prevented and the seat cushion 1 is kept vertical or horizontal.

Figure 5:
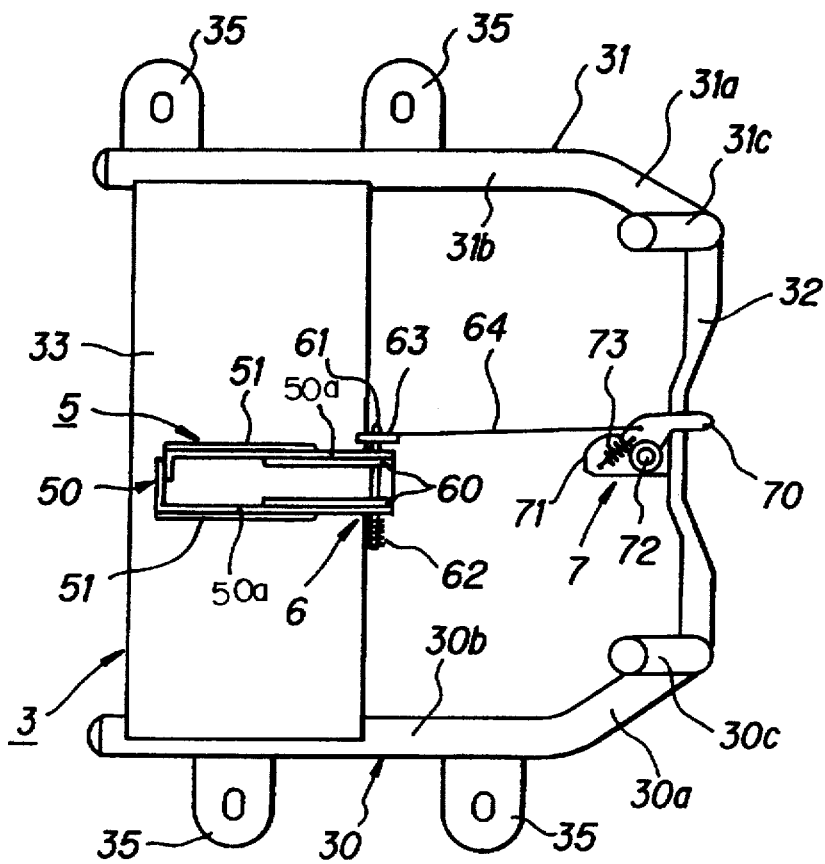
FIG. 5 is a schematic plane view of the support means which is provided with the guide means, the locking means and releasing means.

Referring now to FIG. 5, the hook pieces 60 are arranged between the side wall sections 50a of the guide frame 50 and supported through a support pin 61 to a first end of the guide frame 50 which is opposite to a second end of the guide frame 50 which is adjacent the main seat M. Provided on the support pin is a helical torsion coil spring 62 which always urges the hook pieces 60 in a counterclockwise direction in FIG. 1. Further, a piece 63 is mounted on one end of the support pin 61. The piece 63 is coupled through a wire 64 to releasing means 7 for causing the free section 34c of the movable means 34 to be released from the hook pieces 60.

As shown in FIG. 5, the releasing means 7 is mounted on a support plate 71 which is attached to the space keeping plate 32 of the support means 3. The releasing means 7 comprises an operating lever 70 is pivotally supported through a support pin 72 to the support plate 71 and is always urged in a counterclockwise direction in FIG. 5 by means of a spring 73. One end of the wire 64 is connected to the piece 63 mounted on the end of the support pin 61 of the hook pieces 60. The other end of the wire 64 is connected to the operating lever 70. When the operating lever 70 is operated by a person's hand in a manner to be pivoted in a clockwise direction, the wire 64 is drawn, whereby the support pin 61 of the hook pieces 60 is rotated in the direction opposite to the direction in which the hook pieces 60 are urged by the helical torsion coil spring 62. Simultaneously with the rotation of the support pin 61, the hook pieces 60 are pivoted in the same direction against an action of the helical torsion coil spring 62.

Figure 6:
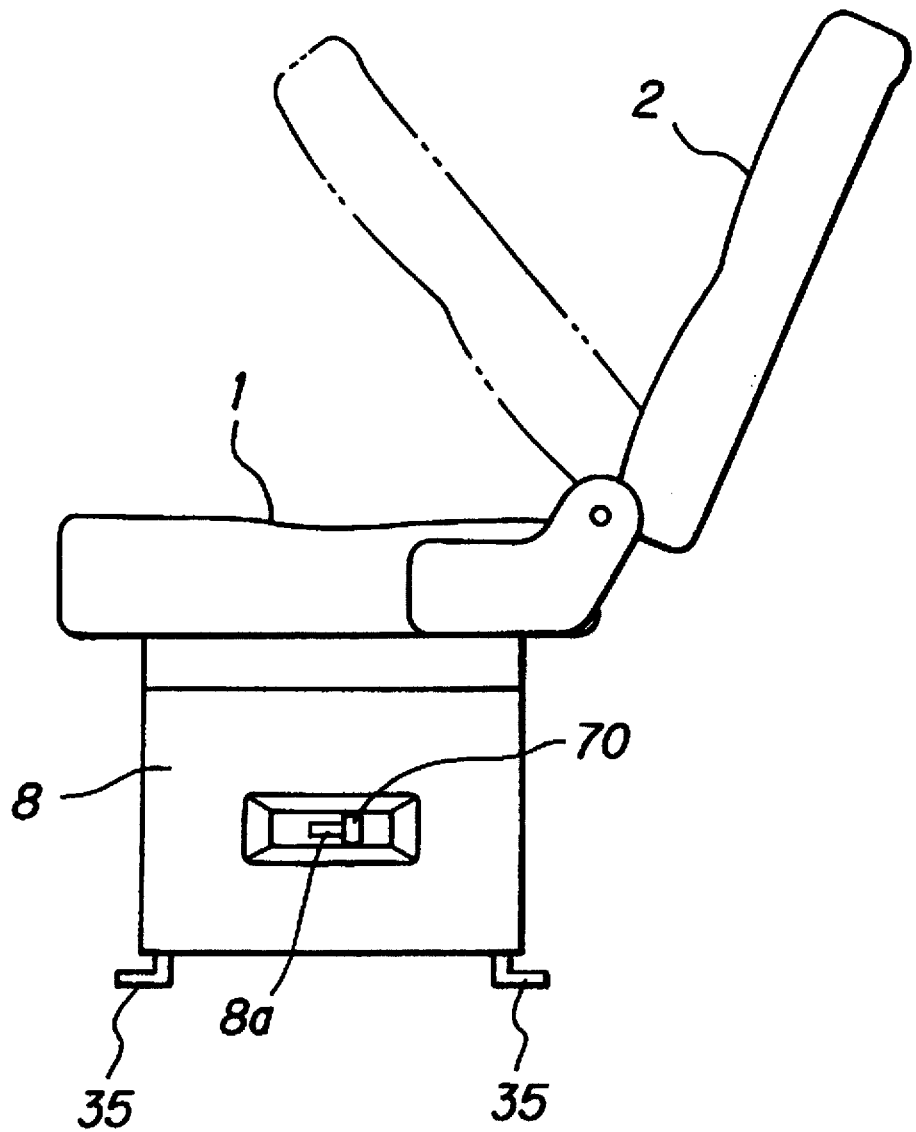
FIG. 6 is a schematic side view of the spare seat in which parts arranged lower than the seat cushion and seat back of the spare seat are covered by an armour cover.

Incidentally, as shown in FIG. 6, parts which are arranged lower than the seat cushion 1 and seat back 2 may be covered by an armour casing 8 having an internal space to allow the pivotal movement of the seat cushion 1 together with the seat back 2. In this case, a slit 8a is formed in a portion of the casing 8 which positionally corresponds to a tip end portion of the operating lever 70 when the parts which are arranged lower than the seat cushion 1 and seat back 2 are covered by the casing 8 for assembly. The tip end portion of the operating lever 70 is projected out Of the armour casing 8 through the slit 8a in order that a person can operate the operating lever 70.

In the spare seat S of the present invention which is constructed as described above, in use of the spare seat S, the free section 34c of the movable means 34 is caught by the hook pieces 60, whereby the seat cushion 1 is locked. In this condition, the movable means 34 is kept vertical at a position, where the free section 34c of the movable means 34 is spaced apart from the main seat M, as shown by solid line in FIG. 1, so that the seat cushion 1 is supported at several points thereof by means of the movable means 34 in addition to the support members 30, 31 and is kept horizontal by means of the support members 30, 31 and the movable means 34. Therefore, the spare seat S can ensure a person a stable sitting.

When the seat cushion 1 and seat back 2 of the spare seat S are to be accommodated vertically in the space about the seat cushion $M_1$ of the main seat M after use of the spare seat, initially the seat back 2 is folded horizontally with respect to the seat cushion 1 and overlapped on the seat cushion 1 by a person. Then, the person operates the operating lever 70 in a manner to cause the operating lever 70 to be pivoted about the support pin 72, whereby the wire 64 is drawn. By such drawing of the wire 64, the support pin 61 of the hook pieces 60 is rotated in the direction opposite to the direction in which the hook pieces 60 are urged by the helical torsion coil spring 62. Simultaneously with the rotation of the support pin 61, the hook pieces 60 are rotated in the same direction against an action of the helical torsion coil spring 62, thereby releasing the free section 34c of the movable means 34 therefrom. As a result, the locking condition of the seat cushion 1 is released. In this condition, when the person pushes up the right side of the seat cushion 1 in FIG. 1, the seat cushion 1 together with the seat back 2 having been overlapped on the seat cushion 1 is pivoted about the support pins 12a, 12b in a counterclockwise direction. Simultaneously with the counterclockwise movement of the seat cushion 1 and seat back 2, the movable means 34 is inclined from a vertical state to a horizontal state and the free section 34c of the movable means 34 is moved in the direction A while being guided by the guide means 5. As the seat cushion 1 together with the seat back 2 is further pivoted in the counterclockwise direction and becomes vertical, the movable means 34 is drawn in a horizontal direction and the free section 34c of the movable means 34 is moved in the direction opposite to the direction A along the guide slit means 52 and arrives at a position adjacent the hook pieces 60. At this time, the person releases the operating lever 70 from the person's hand. As a result, the hook pieces 60 are rotated due to the action of the helical torsion coil spring 62, and catch the free section 34c of the movable means 34, whereby the seat cushion 1 is locked and the pivotal movement of the seat cushion 1 is prevented. Thus, the seat cushion 1 and the seat back 2 are accommodated vertically in the space about the side of the seat cushion $M_1$ of the main seat M in state where the seat cushion 1 and the seat back 2 are kept vertical. Therefore, in this condition, there is no possibility that the seat cushion 1 and seat back 2 will be accidentally collapsed, and the seat cushion 1 and seat back 2 can be securely kept vertical.

As described above, in the illustrated embodiment, the seat cushion 1 is pivotally supported to the support members 30, 31 at the points thereof which are spaced laterally from the side of the seat cushion $M_1$ of the main seat M at the interval L which substantially corresponds in measure to the total width W of the seat cushion 1 and seat back 2 in a folded state, whereby the the standing position of the seat cushion 1 and seat back 2 in the vertically accommodated state is lowered. Therefore, the spare seat S will not prevent a person from walking about in order to sit on and leave the main seat M. Also, the standing position of the seat cushion 1 and seat back 2 in the vertically accommodated state is lowered and securely kept vertical, so that the seat cushion 1 and seat back 2 of the spare seat S in the vertically accommodated state may be used as a headrest and an armrest for a person who has been in occupation of the main seat M.

Assembling of the spare seat S may be carried out at one or more stages. When the assembling of the spare seat S is to be carried out at stages, the assembling of the spare seat S may be carried out by preparing a first assembly which includes the seat cushion 1, the seat back 2 foldably supported to the seat cushion 1, and the movable means 34 pivotally connected to the section 10c of the seat cushion 1 which is adjacent the side of the seat cushion $M_1$ of the main seat M, and a second assembly which includes the support means 3, and the locking means 4 including the guide means 5, the means 6 for catching the movable means 34, and the releasing means 7, separately, and integrating the first assembly with the second assembly. Initially, the second assembly may be individually installed on the floor F of the car. In this case, assembling of the first assembly to the second assembly may performed by causing the free section 34c of the movable means 34 of the first assembly to be movably received through the opened end of the guide slit means in the guide slit means 52 of the guide means 5 of the second assembly installed on the floor F of the car, and causing the seat cushion 1 of the first assembly to be pivotally supported to the support members 30, 31 of the second assembly. Thus, the spare seat S can be rapidly, easily and efficiently assembled.

It will be appreciated that the seat cushion of the spare seat according to the present invention may be pivotally supported to the support members at points thereof which are spaced laterally from the side of the seat cushion of the main seat at an interval which is longer than a total width of the seat cushion and seat back of the spare seat in a folded state, and the seat cushion in use can be securely kept horizontal by means of the movable means in addition to the support members, so that the spare seat can ensure a person a stable sitting.

It will be also appreciated that the seat cushion of the spare seat according to the present invention may be pivotally supported to the support members at points thereof which are spaced laterally from the side of the seat cushion of the main seat at an interval which substantially corresponds in measure to a total width of the seat cushion and seat back of the spare seat in a folded state, whereby the standing position of the seat cushion and seat back of the spare seat in a vertically accommodated state can be lowered.

It will be also appreciated that a spare seat body which includes the seat cushion and the seat back can be easily and efficiently supported to the support means, so that the whole spare seat of the present invention can be neatly and rapidly assembled.

The term and expressions which have been employed are used as terms of description and not of limitation, and there is no intention in the use of such terms and expression of excluding any equivalents of the features shown and described, or portions thereof, but it is recognized that various modifications are possible within the scope of the invention claimed.

What is claimed is:

1. A spare seat for a vehicle, arranged in a space adjacent a side of a seat cushion of a main seat, said spare seat comprising:

a seat cushion rendered horizontal relative to said seat cushion of said main seat in a position of use of said spare seat;

a seat back foldably supported to said seat cushion of said spare seat;

said seat back rendered vertical with respect to said seat cushion of said spare seat in said position of use of said spare seat and folded horizontally and overlapped on said seat cushion of said spare seat after use of said spare seat;

support means pivotally supporting said seat cushion of said spare seat;

said support means adapted to be mounted on a floor of a vehicle in the vicinity of said side of said seat cushion of said main seat;

said seat cushion of said spare seat rendered vertical together with said seat back overlapped on said seat cushion of said spare seat after use of said spare seat, whereby said seat cushion and said seat back of said spare seat are vertically accommodated in said space adjacent the side of the seat cushion of said main seat after use of said spare seat;

said seat cushion of said spare seat pivotally supported to said support means at points thereof which are spaced laterally from the side of said seat cushion of said main seat at an interval which is at least as long as a total width of said seat cushion and seat back of said spare seat in a vertical overlapped state; and locking means for releasably locking said seat cushion of said spare seat to keep said seat cushion of said spare seat horizontal or vertical;

said locking means mounted on said support means and comprising movable means having an end section, said movable means pivotally connected to a section of said seat cushion of said spare seat which is adjacent said side of said seat cushion of said main seat, guide means mounted on said support means for guiding said end section of said movable means in the directions nearer to and away from said main seat in response to pivotal movement of said seat cushion of said spare seat, said end section of said movable means being movably engaged with said guide means in a manner to be movable along said guide means, and catching means mounted on said support means for catching said end section of said movable means to lock said seat cushion of said spare seat.

2. A spare seat as defined in claim 1, wherein said seat cushion of said spare seat is pivotally supported to said support means at points thereof which are spaced laterally from the side of said seat cushion of said main seat at an interval which substantially corresponds in measure to the total width of said seat cushion and seat back of said spare seat in the vertical overlapped state.

3. A spare seat as defined in claim 1, wherein said movable means comprises a substantially U-shaped body in outline, said movable means pivotally connected at end portions of first and second legs of said U-shaped body thereof to said section of said seat cushion of said spare seat which is adjacent the side of said seat cushion of said main seat in said position use and wherein said guide means includes guide slit means, a horizontal member spanning said first and second legs of said U-shaped body of said movable means constituting said end section of said movable means and movably received in said guide slit means of said guide means in a manner to be movable along said guide slit means of said guide means.

4. A spare seat as defined in claim 2, wherein said movable means comprises a substantially U-shaped body in outline, said movable means pivotally connected at end portions of first and second legs of said U-shaped body thereof to said section of said seat cushion of said spare seat which is adjacent the side of said seat cushion of said main seat in said position of use, and wherein said guide means includes guide slit means, a horizontal member spanning said first and second legs of said U-shaped body of said movable means constituting said end section of said movable means and movably received in said guide slit means of said guide means in a manner to be movable along said guide slit means of said guide means.

5. A spare seat as defined in claim 1, wherein said spare seat comprises:

a first assembly including said seat cushion of said spare seat, said seat back foldably supported to said seat cushion of said spare seat, and said movable means pivotally connected to said section of said seat cushion of said spare seat which is adjacent the side of said seat cushion of said main seat; and a second assembly including said support means, and said locking means including said guide means and said catching means;

said first and second assemblies being integrated such that (1) said end section of said movable means is movably engaged with said guide means in such a manner that said end section of said movable means can be moved along said guide means, and (2) said seat cushion of said spare seat is pivotally supported by said support means.

6. A spare seat as defined in claim 2, wherein said spare seat comprises:

a first assembly including said seat cushion of said spare seat, said seat back foldably supported to said seat cushion of said spare seat, and said movable means pivotally connected to said section of said seat cushion of said spare seat which is adjacent the side of said seat cushion of said main seat; and a second assembly including said support means, and said locking means including said guide means and said catching means;

said first and second assemblies being integrated such that (1) said end section of said movable means is movably engaged with said guide means in such a manner that said end section of said movable means can be moved along said guide means, and (2) said seat cushion of said spare seat is pivotally supported by said support means.

7. A spare seat as defined in claim 3, wherein said guide slit means is open at one end thereof, and wherein said spare seat comprises:

a first assembly including said seat cushion of said spare seat, said seat back foldably supported to said seat cushion of said spare seat, and said movable means pivotally connected at said both end portions of said U-shaped body thereof to said section of said seat cushion of said spare seat which is adjacent the side of said seat cushion of said main seat; and a second assembly including said support means, and said locking means including said guide means and said catching means;

said first and second assemblies being integrated such that (1) said horizontal portion of said U-shaped body of said movable means is movably received in said guide slit means of said guide means through said open end of said guide slit means in such a manner that said horizontal portion of said U-shaped body of said movable means can be moved along said guide slit means, and (2) said seat cushion of said spare seat is pivotally supported by said support means.

8. A spare seat as defined in claim 4, wherein said guide slit means is open at one end thereof, and wherein said spare seat comprises:

a first assembly including said seat cushion of said spare seat, said seat back foldably supported to said seat cushion of said spare seat, and said movable means pivotally connected at said both end portions of said U-shaped body thereof to said section of said seat cushion of said spare seat which is adjacent the side of said seat cushion of said main seat; and a second assembly including said support means, and said locking means including said guide means and said catching means;

said first and second assemblies being integrated such that (1) said horizontal portion of said U-shaped body of said movable means is movably received in said guide slit means of said guide means through said open end of said guide slit means in such a manner that said horizontal portion of said U-shaped body of said movable means can be moved along said guide slit means, and (2) said seat cushion of said spare seat is pivotally supported by said support means.

9. A spare seat as defined in claim 1, further including releasing means mounted on said support means for causing said seat cushion of said spare seat to be released from a locked position.

10. A spare seat as defined in claim 9, wherein said releasing means includes an operating lever.

11. A spare seat as defined in claim 10, wherein components of said spare seat other than said seat cushion and seat back of said spare seat are covered by an armour casing, said armour casing having an internal space to allow the pivotal movement of said seat cushion of said spare seat together with said seat back, and a slit through a portion of said armour casing which positionally corresponds to a tip end portion of said operating lever when said components are covered by said armour casing, said tip end portion of said operating lever projecting out of said armour casing through said slit in said armour casing.

12. A spare seat as defined in claim 2, further including releasing means mounted on said support means for causing said seat cushion of said spare seat to be released from a locked position.

13. A spare seat as defined in claim 12, wherein said releasing means includes an operating lever.

14. A spare seat as defined in claim 13, wherein components of said spare seat other than said seat cushion and seat back of said spare seat are covered by an armour casing, said armour casing having an internal space to allow the pivotal movement of said seat cushion of said spare seat together with said seat back, and a slit through a portion of said armour casing which positionally corresponds to a tip end portion of said operating lever when said components are covered by said armour casing, said tip end portion of said operating lever projecting out of said armour casing through said slit in said armour casing.

15. A spare seat as defined in claim 3, further including releasing means mounted on said support means for causing said seat cushion of said spare seat to be released from a locked position.

16. A spare seat as defined in claim 15, wherein said releasing means includes an operating lever.

17. A spare seat as defined in claim 16, wherein components of said spare seat other than said seat cushion and seat back of said spare seat are covered by an armour casing, said armour casing having an internal space to allow the pivotal movement of said seat cushion of said spare seat together with said seat back, and a slit through a portion of said armour casing which positionally corresponds to a tip end portion of said operating lever when said components are covered by said armour casing, said tip end portion of said operating lever projecting out of said armour casing through said slit in said armour casing.

18. A spare seat as defined in claim 4, further including releasing means mounted on said support means for causing said seat cushion of said spare seat to be released from a locked position.

19. A spare seat as defined in claim 18, wherein said releasing means includes an operating lever.

20. A spare seat as defined in claim 19, wherein components of said spare seat other than said seat cushion and seat back of said spare seat are covered by an armour casing, said armour casing having an internal space to allow the pivotal movement of said seat cushion of said spare seat together with said seat back, and a slit through a portion of said armour casing which positionally corresponds to a tip end portion of said operating lever when said components are covered by said armour casing, said tip end portion of said operating lever projecting out of said armour casing through said slit in said armour casing.

21. A spare seat as defined in claim 5, further including releasing means mounted on said support means for causing said seat cushion of said spare seat to be released from a locked position.

22. A spare seat as defined in claim 21, wherein said releasing means includes an operating lever.

23. A spare seat as defined in claim 22, wherein components of said spare seat other than said seat cushion and seat back of said spare seat are covered by an armour casing, said armour casing having an internal space to allow the pivotal movement of said seat cushion of said spare seat together with said seat back, and a slit through a portion of said armour casing which positionally corresponds to a tip end portion of said operating lever when said components are covered by said armour casing, said tip end portion of said operating lever projecting out of said armour casing through said slit in said armour casing.

24. A spare seat as defined in claim 6, further including releasing means mounted on said support means for causing said seat cushion of said spare seat to be released from a locked position.

25. A spare seat as defined in claim 24, wherein said releasing means includes an operating lever.

26. A spare seat as defined in claim 25, wherein components of said spare seat other than said seat cushion and seat back of said spare seat are covered by an armour casing, said armour casing having an internal space to allow the pivotal movement of said seat cushion of said spare seat together with said seat back, and a slit through a portion of said armour casing which positionally corresponds to a tip end portion of said operating lever when said components are covered by said armour casing, said tip end portion of said operating lever projecting out of said armour casing through said slit in said armour casing.

27. A spare seat as defined in claim 7, further including releasing means mounted on said support means for causing said seat cushion of said spare seat to be released from a locked position.

28. A spare seat as defined in claim 27, wherein said releasing means includes an operating lever.

29. A spare seat defined in claim 28, wherein components of said spare seat other than said seat cushion and seat back of said spare seat are covered by an armour casing, said armour casing having an internal space to allow the pivotal movement of said seat cushion of said spare seat together with said seat back, and a slit through a portion of said armour casing which positionally corresponds to a tip end portion of said operating lever when said components are covered by said armour casing, said tip end portion of said operating lever projecting out of said armour casing through said slit in said armour casing.

30. A spare seat as defined in claim 8, further including releasing means mounted on said support means for causing said seat cushion of said spare seat to be released from a locked position.

31. A spare seat as defined in claim 30, wherein said releasing means includes an operating lever.

32. A spare seat defined in claim 31, wherein components of said spare seat other than said seat cushion and seat back of said spare seat are covered by an armour casing, said armour casing having an internal space to allow the pivotal movement of said seat cushion of said spare seat together with said seat back, and a slit through a portion of said armour casing which positionally corresponds to a tip end portion of said operating lever when said components are covered by said armour casing, said tip end portion of said operating lever projecting out of said armour casing through said slit in said armour, casing.

33. A spare seat for a vehicle, arranged in a space adjacent a side of a seat cushion of a main seat, said spare seat comprising:

a seat cushion rendered horizontal relative to said seat cushion of said main seat in a position of use of said spare seat;

a seat back foldably supported to said seat cushion of said spare seat;

said seat back rendered vertical with respect to said seat cushion of said spare seat in said position of use of said spare seat and folded horizontally and overlapped on said seat cushion of said spare seat after use of said spare seat;

support means pivotally supporting said seat cushion of said spare seat;

said support means adapted to be mounted on a floor of a vehicle in the vicinity of said side of said seat cushion of said main seat;

said seat cushion of said spare seat rendered vertical together with said seat back overlapped on said seat cushion of said spare seat after use of said spare seat, whereby said seat cushion and said seat back of said spare seat are vertically accommodated in said space adjacent the side of said seat cushion of said main seat after use of said spare seat;

said seat cushion of said spare seat pivotally supported by said support means at points thereof which are spaced laterally from the side of said seat cushion of said main seat at an interval which is at least as long as a total width of said seat cushion and seat back of said spare seat in a vertical overlapped state;

locking means for releasably locking said seat cushion of said spare seat to keep said seat cushion of said spare seat horizontal or vertical;

said locking means mounted on said support means and comprising movable means having a substantially U-shaped body in outline, said movable means pivotally connected at end portions of first and second legs of said U-shaped body thereof to a section of said seat cushion of said spare seat which is adjacent said side of said seat cushion of said main seat in said position of use, guide means mounted on said support means for guiding a horizontal member spanning said first and second legs of said U-shaped body of said movable means in the directions toward and away from said main seat in response to pivotal movement of said seat cushion of said spare seat, said guide means including guide slit means, said horizontal portion of said U-shaped body of said movable means movably received in said guide slit means of said guide means, and catching means mounted on said support means for catching said horizontal portion of said movable means to lock said seat cushion of said spare seat; and releasing means mounted on said support means for causing said seat cushion of said spare seat to be released from said locking means.

34. A spare seat as defined in claim 33, wherein said seat cushion of said spare seat is pivotally supported to said support means at points thereof which are spaced laterally from the side of said seat cushion of said main seat at an interval which substantially corresponds in measure to the total width of said seat cushion and seat back of said spare seat in the vertical overlapped state.

35. A spare seat defined in claim 33, wherein said guide slit means is open at one end thereof, and wherein said spare seat comprises:

a first assembly including said seat cushion of said spare seat, said seat back foldably supported to said seat cushion of said spare seat, and said movable means pivotally connected at said both end portions of said U-shaped body thereof to said section of said seat cushion of said spare seat which is adjacent the side of said seat cushion of said main seat; and a second assembly including said support means, said releasing means, and said locking means including said guide means and said catching means;

said first and second assemblies being integrated such that (1) said horizontal portion of said U-shaped body of said movable means is movably received in said guide slit means of said guide means through said open end of said guide slit means and (2) said seat cushion of said spare seat is pivotally supported by said support means.

36. A spare seat as defined in claim 34, wherein said guide slit means is open at one end thereof, and wherein said spare seat comprises:

a first assembly including said seat cushion of said spare seat, said seat back foldably supported to said seat cushion of said spare seat, and said movable means pivotally connected at said both end portions of said U-shaped body thereof to said section of said seat cushion of said spare seat which is adjacent the side of said seat cushion of said main seat; and a second assembly including said support means, said releasing means, and said locking means including said guide means and said catching means;

said first and second assemblies being integrated such that (1) said horizontal portion of said U-shaped body of said movable means is movably received in said guide slit means of said guide means through said open end of said guide slit means and (2) said seat cushion of said spare seat is pivotally supported by said support means.

37. A spare seat as defined in claim 33, wherein said releasing means includes an operating lever.

38. A spare seat defined in claim 36, wherein components of said spare seat other than said seat cushion and seat back of said spare seat are covered by an armour casing, said armour casing having an internal space to allow the pivotal movement of said seat cushion of said spare seat together with said seat back, and a slit through a portion of said armour casing which positionally corresponds to a tip end portion of said operating lever when said components are covered by said armour casing, said tip end portion of said operating lever projecting out of said armour casing through said slit in said armour casing.

39. A spare seat as defined in claim 34, wherein said releasing means includes an operating lever.

40. A spare seat as defined in claim 39, wherein components of said spare seat other than said seat cushion and seat back of said spare seat are covered by an armour casing, said armour casing having an internal space to allow the pivotal movement of said seat cushion of said spare seat together with said seat back, and a slit through a portion of said armour casing which positionally corresponds to a tip end portion of said operating lever when said components are covered by said armour casing, said tip end portion of said operating lever projecting out of said armour casing through said slit in said armour casing.

41. A spare seat as defined in claim 33, wherein said releasing means includes an operating lever, wherein said guide slit means is open at one end thereof, and wherein said spare seat comprises:

a first assembly including said seat cushion of said spare seat, said seat back foldably supported to said seat cushion of said spare seat, and said movable means pivotally connected at said both end portions of said U-shaped body thereof to said section of said seat cushion of said spare seat which is adjacent the side of said seat cushion of said main seat; and a second assembly including said support means, said releasing means including said operating lever, and said locking means including said guide means and said catching means;

said first and second assemblies being integrated such that (1) said horizontal portion of said U-shaped body of said movable means is movably received in said guide slit means of said guide means through said open end of said guide slit means and (2) said seat cushion of said spare seat is pivotally supported by said support means.

42. A spare seat defined in claim 41, wherein components of said spare seat other than said seat cushion and seat back of said spare seat are covered by an armour casing, said armour casing having an internal space to allow the pivotal movement of said seat cushion of said spare seat together with said seat back, and a slit through a portion of said armour casing which positionally corresponds to a tip end portion of said operating lever when said components are covered by said armour casing, said tip end portion of said operating lever projecting out of said armour casing through said slit in said armour casing.

43. A spare seat as defined in claim 34, wherein said releasing means includes an operating lever, wherein said guide slit means is open at one end thereof, and wherein said spare seat comprises:

a first assembly including said seat cushion of said spare seat, said seat back foldably supported to said seat cushion of said spare seat, and said movable means pivotally connected at said both end portions of said U-shaped body thereof to said section of said seat cushion of said spare seat which is adjacent the side of said seat cushion of said main seat; and a second assembly including said support means, said releasing means including said operating lever, and said locking means including said guide means and said catching means;

said first and second assemblies being integrated such that (1) said horizontal portion of said U-shaped body of said movable means is movably received in said guide slit means of said guide means through said open end of said guide slit means and (2) said seat cushion of said spare seat is pivotally supported by said support means.

44. A spare seat defined in claim 43, wherein components of said spare seat other than said seat cushion and seat back of said spare seat are covered by an armour casing, said armour casing having an internal space to allow the pivotal movement of said seat cushion of said spare seat together with said seat back, and a slit through a portion of said armour casing which positionally corresponds to a tip end portion of said operating lever when said components are covered by said armour casing, said tip end portion of said operating lever projecting out of said armour casing through said slit in said armour casing.

* * * * *